US012033254B2

(12) United States Patent
Gebre et al.

(10) Patent No.: US 12,033,254 B2
(45) Date of Patent: Jul. 9, 2024

(54) MODIFYING AN APPEARANCE OF HAIR (71) Applicant: KONINKLIJKE PHILIPS N.V., Eindhoven (NL)

(72) Inventors: Binyam Gebrekidan Gebre, Eindhoven (NL); Karl Catharina Van Bree, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 169 days.

(21) Appl. No.: 17/594,168

(22) PCT Filed: Apr. 7, 2020

(86) PCT No.: PCT/EP2020/059839
§ 371 (c)(1),
(2) Date: Oct. 5, 2021

(87) PCT Pub. No.: WO2020/207997
PCT Pub. Date: Oct. 15, 2020

(65) Prior Publication Data
US 2022/0207807 A1    Jun. 30, 2022

(30) Foreign Application Priority Data
Apr. 9, 2019  (EP) .................... 19168116

(51) Int. Cl.
*G06T 11/60*       (2006.01)
*G06N 3/02*        (2006.01)
(Continued)

(52) U.S. Cl.
CPC ............... *G06T 11/60* (2013.01); *G06N 3/02* (2013.01); *G06T 7/11* (2017.01); *G06V 10/7747* (2022.01);
(Continued)

(58) Field of Classification Search
CPC ....... G06T 11/60; G06T 7/11; G06T 2200/24; G06T 2207/20081; G06T 2207/20092;
(Continued)

(56) References Cited

U.S. PATENT DOCUMENTS 4,731,743 A      3/1988  Blancato
10,402,689 B1 *  9/2019  Bogdanovych ... G06F 18/24765
(Continued)

FOREIGN PATENT DOCUMENTS

CN    107392118 A    11/2017
JP    2018055384 A    4/2018

OTHER PUBLICATIONS

International Search Report and Written Opinion, International Application No. PCT/EP2020/059839, dated Apr. 29, 2020.
(Continued)

*Primary Examiner* — Said Broome
*Assistant Examiner* — Andrew Shin (57)           ABSTRACT

According to various embodiments, a method of modifying an appearance of hair in an image of a head of a subject is disclosed. The method comprises providing, as an input to a first trained neural network model, an image of a head of a subject having a region of hair; generating, using the first trained neural network model and based on the image of the head, a hair layer comprising an estimated representation of portions of the image containing hair, and a face layer comprising an estimated representation of the head of the subject with the region of hair having been removed; providing, as an input to a second trained neural network model, an indication of a defined hairstyle to be incorporated into the image, and the generated hair layer; generating, using the second trained neural network model, a modified hair layer based on the indication of the defined hairstyle and the generated hair layer; and generating, using a processor, a
(Continued)

modified image of the head of the subject by applying the modified hair layer to the generated face layer.

20 Claims, 5 Drawing Sheets

(51) Int. Cl.
  *G06T 7/11* (2017.01)
  *G06V 10/774* (2022.01)
  *G06V 10/776* (2022.01)
(52) U.S. Cl.
  CPC ........ *G06V 10/776* (2022.01); *G06T 2200/24* (2013.01); *G06T 2207/20081* (2013.01); *G06T 2207/20084* (2013.01); *G06T 2207/20092* (2013.01); *G06T 2207/30168* (2013.01)
(58) Field of Classification Search
  CPC ............ G06T 2207/30168; G06N 3/02; G06V 10/7747; G06V 10/776
  See application file for complete search history.

(56) References Cited

U.S. PATENT DOCUMENTS

| | | | | |
|---|---|---|---|---|
| 10,891,723 | B1* | 1/2021 | Chung | G06T 5/40 |
| 2014/0306982 | A1* | 10/2014 | Ollivier | G06T 11/00 |
| | | | | 345/589 |
| 2016/0154993 | A1* | 6/2016 | Aarabi | H04N 1/628 |
| | | | | 382/118 |
| 2018/0173997 | A1 | 6/2018 | Liu | |
| 2019/0051048 | A1* | 2/2019 | Zhou | G06N 3/08 |
| 2019/0051057 | A1 | 2/2019 | Neophytou | |
| 2019/0164322 | A1* | 5/2019 | Kong | G06T 7/11 |
| 2019/0332850 | A1* | 10/2019 | Sharma | G06T 5/20 |
| 2020/0082157 | A1* | 3/2020 | Susskind | G06V 40/18 |

OTHER PUBLICATIONS

Zhou, Y. et al., "HairNet: Single-View Hair Reconstruction Using Convolutional Neural Networks", Lecture Notes in Computer Science—Computer Vision—ECCV 2018—15th European Conference, 2018.
Meng Zhang et al: "Hair-GANs: Recovering 3D Hair Structure from a Single Image", Cornell University Library, Nov. 15, 2018.
Meng Lei Chai et al: "AutoHair", ACM Transactions on Graphics, vol. 35, No. 4, Jul. 11, 2016, pp. 1-12.
Shunsuke Saito et al: "3D hair synthesis using volumetric variational autoencoders", Dec. 4, 2018.
Drettakis, G. et al., "Image-based Shaving", vol. 27 (2008), No. 2.
Brock, A. et al., "Neural Photo Editing With Introspective Adversarial Networks", Published as a conference paper at ICLR 2017.
Shen, W. et al., "Learning Residual Images for Face Attribute Manipulation", Apr. 2017.
"Philips AR Grooming", YouTube Video, Jun. 21, 2018, https://www.youtube.com/watch?v=tA6GBTH9sVE#action=share.

* cited by examiner

MODIFYING AN APPEARANCE OF HAIR

CROSS-REFERENCE TO PRIOR APPLICATIONS

This application is the U.S. National Phase application under 35 U.S.C. § 371 of International Application No. PCT/EP2020/059839, filed on 7 Apr. 2020, which claims the benefit of European Patent Application No. 19168116.2, filed on 9 Apr. 2019. These applications are hereby incorporated by reference herein.

FIELD OF THE INVENTION

The invention relates to modifying an image and, in particular, to modifying an appearance of hair in an image of head of a subject.

BACKGROUND OF THE INVENTION

Personal care activities can form a significant part of a person's day. For example, humans may spend time applying make-up products or skin care products, and adjusting, restyling and cutting hair on their head and/or their face (e.g. facial hair). Typically, a person may look at their reflection in a mirror while performing a personal care activity to achieve a desired outcome from the activity.

When a person wishes to adjust, restyle or cut hair on their head or face, it can be helpful to be able to visualise how a particular hairstyle may appear, prior to implementing a physical change in their appearance. In an existing system, it is possible for a user to superimpose an image of a particular facial hairstyle over an image of their face, so that they can envisage what they might look like with that particular facial hairstyle. In such a system, however, pixels in the image of the new hairstyle are merely placed over (e.g. on top of) the pixels of the image of the user. Therefore, a user who has existing hair (i.e. facial or cranial) on their head may not be able to view a realistic representation of their head with a modified hairstyle, as it might not be clearly visible in view of their existing hair.

Therefore, it would be desirable to be able to modify an appearance of hair in an image of a subject in a more realistic manner, whether or not the subject has existing hair. Thus, there is a need for an improved system for generating and viewing an image of how they might appear with a particular hairstyle.

SUMMARY OF THE INVENTION

As indicated above, a limitation with existing techniques used to generate images of people with a modified hairstyle is that existing hair in the image can adversely affect the appearance of the new or modified hair. For example, for a user who has a full beard, it may be difficult using existing techniques to generate a realistic image of the user with a goatee, as the goatee beard may not be clearly visible over the existing full beard. It has been recognised, therefore, that there would be value in a system which is capable of generating a realistic image of a user with a modified hairstyle regardless of the user's existing hairstyle. According to embodiments disclosed herein, the present invention aims to overcome the drawbacks of existing systems by creating a modified image of the user in which at least a portion of the user's existing hair has been removed before a new hairstyle is added to the image.

According to a first aspect, there is provided a method of modifying an appearance of hair in an image of a head of a subject, the method comprising: providing, as an input to a first trained neural network model, an image of a head of a subject having a region of hair; generating, using the first trained neural network model and based on the image of the head, a hair layer comprising an estimated representation of portions of the image including hair, and a face layer comprising an estimated representation of the head of the subject with the region of hair having been removed; providing, as an input to a second trained neural network model, an indication of a defined hairstyle to be incorporated into the image, and the generated hair layer; generating, using the second trained neural network model, a modified hair layer based on the indication of the defined hairstyle and the generated hair layer; and generating, using a processor, a modified image of the head of the subject by applying the modified hair layer to the generated face layer.

By using a trained neural network model to generate the face layer, a realistic estimated representation of the user's head can be generated with existing hair having been removed. Similarly, by using a trained neural network model to generate a hair layer to be applied to the generated face layer, the resulting image is realistic.

In some embodiments, the method may further comprise generating, using the first trained neural network model and based on the image of the head, a hair mask defining the region of the image that contains hair.

The method may, in some embodiments, further comprise receiving, at a processor, an annotation of the image of the head of the subject, the annotation comprising an indication of the region of the image that contains hair; and calculating, using a processor, a degree of accuracy of the generated hair mask with regard to the received annotation.

In some embodiments, the method may further comprise providing, as an input to the second trained neural network model, the generated hair mask. Generating the modified hair layer may comprise generating a modified hair layer based on the generated hair mask, such that hair in the modified hair layer is generated only within regions defined by the generated hair mask.

The method may, in some embodiments, further comprise receiving, via a user interface, a user input to modify a parameter of at least one of the generated hair layer, the indication of the defined hairstyle and the hair mask.

In some embodiments, at least one of the first and second trained neural network models comprises or forms part of a generative adversarial network.

The method may, in some embodiments, further comprise providing the modified image for presentation to a user.

In some embodiments, the method may further comprise evaluating, using a discriminative network, a quality of the generated face layer with regard to an image of a head of a subject with no visible hair in the region.

The method may, in some embodiments, further comprise evaluating, using a discriminative network, a quality of the generated modified image of the head of the subject.

According to a second aspect, there is provided a method of training a neural network model to manipulate an appearance of hair in an image of a head of a subject, the method comprising: generating a training dataset comprising a plurality of images of heads of subjects, each having hair in a particular region, and a plurality of images of heads of subjects, each without hair in the particular region; and training the neural network model to generate, based on an input image of a head of a subject having hair in the particular region, an estimated representation of the head of the subject with the hair in the particular region having been removed.

According to a third aspect, there is provided a method of training a neural network model to manipulate an appearance of hair in an image, the method comprising: generating a training dataset comprising a plurality of hair layers, each hair layer comprising an estimated representation of portions of an image containing hair, and a plurality of indicators of defined hairstyles to be incorporated into an image; and training the neural network model to generate, based on an input hair layer and a particular defined hairstyle, a modified hair layer.

The method may, in some embodiments, further comprise providing to the neural network model during said training, a hair mask defining an extent of a hair-containing portion of the input hair layer and a noise element.

According to a fourth aspect, there is provided a computer program product comprising a computer-readable medium, the computer-readable medium having computer-readable code embodied therein, the computer-readable code being configured such that, on execution by a suitable computer or processor, the computer or processor is caused to perform steps of the methods disclosed herein.

According to a fifth aspect, there is provided an apparatus for modifying an image of a head of a subject, the apparatus comprising: a memory comprising instruction data representing a set of instructions; and a processor configured to communicate with the memory and to execute the set of instructions, wherein the set of instructions, when executed by the processor, cause the processor to: provide, as an input to a first trained neural network model, an image of a head of a subject having a region of hair; generate, using the first trained neural network model and based on the image of the head, a hair layer comprising an estimated representation of portions of the image including hair, and a face layer comprising a representation of the head of the subject with the region of hair having been removed; provide, as an input to a second trained neural network model, an indication of a defined hairstyle to be incorporated into the image, and the generated hair layer; generate, using the second trained neural network model and based on the indication of the defined hairstyle and the generated hair layer, a modified hair layer resembling the defined hairstyle; and generate a modified image of the head of the subject by applying the modified hair layer to the generated face layer.

The apparatus may, in some embodiments, further comprise a display to display the modified image of the head of the subject.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

As noted above, there are provided improved methods for modifying an appearance of hair in an image, and an apparatus for performing the methods. More specifically, there are provided methods that make use of trained classifiers, such as neural networks models, to generate an image of a subject with portion of the subject's hair having been removed, and to generate a further image of the subject having a new or modified hairstyle.

As used herein, the term "hairstyle" is intended to include an arrangement or appearance of hair either on the top, side or back of a subject's head (i.e. cranial hair) or hair on the user's face, including eyebrows, sideburns, moustaches and beards (i.e. facial hair). Thus, while examples described herein are in the context of facial hair, the invention is equally applicable to hair located elsewhere on the subject, such as cranial hair.

As used herein, the term "trained classifier" or "trained neural network" is intended to include any type of model or algorithm trained using machine learning techniques. One example of a type of trained classifier is a trained artificial neural network model. Artificial neural networks or, simply, neural networks, will be familiar to those skilled in the art, but in brief, a neural network is a type of model that can be used to classify data (for example, classify, or identify the contents of image data) or predict or estimate an outcome given some input data. The structure of a neural network is inspired by the human brain. Neural networks are comprised of layers, each layer comprising a plurality of neurons. Each neuron comprises a mathematical operation. In the process of classifying a portion of data, the mathematical operation of each neuron is performed on the portion of data to produce a numerical output, and the outputs of each layer in the neural network are fed into the next layer sequentially. Generally, the mathematical operations associated with each neuron comprise one or more weights that are tuned during the training process (e.g. the values of the weights are updated during the training process to tune the model to produce more accurate classifications).

For example, in a neural network model for generating a portion of an image (e.g. a portion of an image of a head of a subject having had a portion of hair removed), each neuron in the neural network may comprise a mathematical operation comprising a weighted linear sum of the pixel (or in three dimensions, voxel) values in the image followed by a non-linear transformation. Examples of non-linear transformations used in neural networks include sigmoid functions, the hyperbolic tangent function and the rectified linear function. The neurons in each layer of the neural network generally comprise a different weighted combination of a single type of transformation (e.g. the same type of transformation, sigmoid etc. but with different weightings). As will be familiar to the skilled person, in some layers, the same weights may be applied by each neuron in the linear sum; this applies, for example, in the case of a convolution layer. The weights associated with each neuron may make certain features more prominent (or conversely less prominent) in the classification process than other features and thus adjusting the weights of neurons in the training process trains the neural network to place increased significance on specific features when generating an image. Generally, neural networks may have weights associated with neurons and/or weights between neurons (e.g. that modify data values passing between neurons).

As briefly noted above, in some neural networks, such as convolutional neural networks, lower layers such as input or hidden layers in the neural network (i.e. layers towards the beginning of the series of layers in the neural network) are activated by (i.e. their output depends on) small features or patterns in the portion of data, while higher layers (i.e. layers towards the end of the series of layers in the neural network) are activated by increasingly larger features in the portion of data.

Generally, the neural network model may comprise feed forward models (such as convolutional neural networks, autoencoder neural network models, probabilistic neural network models and time delay neural network models), radial basis function network models, recurrent neural network models (such as fully recurrent models, Hopfield models, or Boltzmann machine models), or any other type of neural network model comprising weights.

Figure 1:
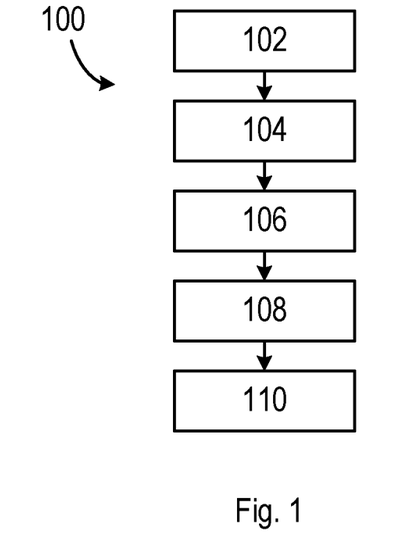
FIG. 1 is a flowchart of an example of a method of modifying an appearance of hair in an image, according to various embodiments.

According to a first aspect, the present invention provides a method of modifying an appearance of hair in an image. FIG. 1 is a flowchart of an example of a method 100 for modifying an appearance of hair in an image of a head of a subject. The method 100 comprises, at step 102, providing, as an input to a first trained neural network model, an image of a head of a subject having a region of hair. The image may be a previously-acquired image that has been stored in a memory or storage medium (e.g. in a database), and subsequently retrieved and provided to the neural network model. Alternatively, the image may be acquired in real time by image acquisition apparatus, such as a camera, or any other type of image capturing device. For example, the image may be captured using a camera device associated with a smartphone, a tablet computer, a laptop computer, a wearable device (e.g. a smartwatch), or an interactive mirror, also referred to as a smart mirror. An interactive mirror is a unit which, in addition to functioning as a mirror to show a user their reflection, is also capable of displaying information to the user. Information, such as text, images and videos, may be displayed on a display portion of the interactive mirror which may, for example, be positioned behind a mirrored (or partially-mirrored) panel or a mirrored (or partially-mirrored) surface. In this way, the display screen, or portions thereof, may be visible through the mirror portion, so that a user is able to simultaneously view their reflection and information presented on the display screen.

The "region of hair" of the user may comprise one or more areas of hair on the user's head, including cranial hair and/or facial hair. While a user may have both cranial hair and facial hair, the "region" of hair may be considered to be the portion of the image in which the hair is to be digitally removed and replaced by a representation of hair in a new hairstyle. In some embodiments, therefore, a user may define in the image the portion of their hair that is to be modified using the claimed method.

At step 104, the method 100 comprises generating, using the first trained neural network model and based on the image of the head, a hair layer (H) comprising an estimated representation of portions of the image including hair, and a face layer (F) comprising an estimated representation of the head of the subject with the region of hair having been removed. The hair layer may, in some embodiments be considered to comprise an estimated representation of the head of the subject including the region of hair. Thus, the first neural network is trained to take an image of a head having a region of hair (e.g. a beard), and generate as an output an image of the head without that region of hair. In other words, the trained neural network predicts what the head of the subject looks like in the absence of the region of hair. Details of how the neural network is trained to perform this task are provided below. However, in general, the first neural network is trained using training data comprising a plurality of images of heads of people with and without cranial hair and facial hair. During the training process, the neural network learns to recognise features, and associations between features, that allow it to predict what the skin of a subject's head is likely to look like beneath the region of hair. The neural network model then generates a representation (e.g. pixels to replace the region of hair in the image) of that portion of the head of the subject without the region on hair, which is referred to herein as the "face layer" (F).

In addition to the face layer (F) the first neural network also estimates the portions of the image which include hair, known as the hair layer (H). In some embodiments, the first neural network may estimate all regions of the image that contain hair (e.g. regions of both cranial hair and facial hair) while, in other embodiments, the first neural network may estimate just regions containing cranial hair, or just regions containing facial hair. For example, a user may provide an indication of the portion of hair (e.g. cranial of facial) to be included in the hair layer (H) generated by the first neural network.

Figure 2:
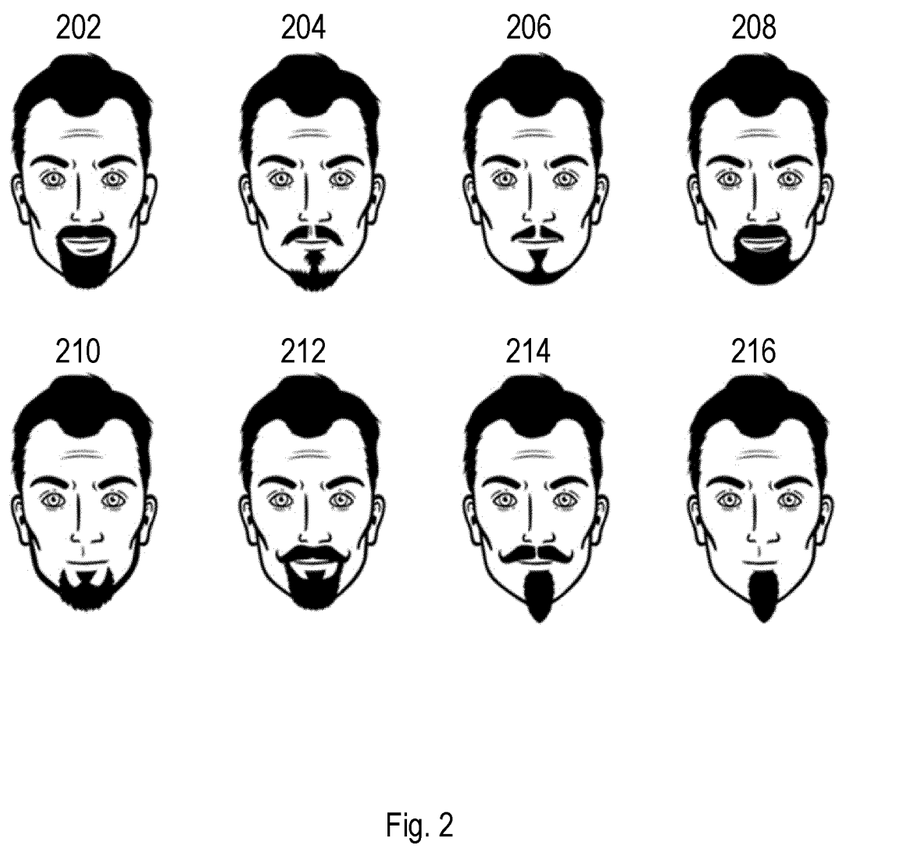
FIG. 2 is an illustration of an example of a plurality of hairstyles.

The method 100 comprises, at step 106, providing, as an input to a second trained neural network model, an indication of a defined hairstyle to be incorporated into the image, and the generated hair layer (H). The hair layer (H) is the hair layer generated by the first trained neural network in step 104. The indication of the defined hairstyle may comprise a user-selected indication (e.g. a selection of a desired hairstyle made by a user via a user interface), or one of a plurality of predetermined hairstyles. For example, in an example in which a user wishes to see what they would look like with different facial hair, the defined hairstyle may comprise one of the defined facial hairstyles shown in FIG. 2. In FIG. 2, the set of facial hairstyles includes a full goatee 202, a goatee and moustache 204, an anchor beard 206, an extended goatee 208, a goatee with chin strap 210, a handlebar moustache with goatee 212, a handlebar moustache with chin puff 214, and a "Norse skipper" beard 216. In other examples, other hairstyles may be included in the plurality of hairstyles from which the defined hairstyle may be selected.

The second neural network is trained to adapt or transform the hair layer that is generated by the first neural network, so that it more closely resembles the defined hairstyle. Thus, at step 108, the method 100 comprises generating, using the second trained neural network model, a modified hair layer (H2) based on the indication of the defined hairstyle and the generated hair layer. For example, if image provided to the first neural network includes a full beard, then the hair layer generated by the first neural network will include the full beard. If the defined hairstyle comprises an extended goatee 208, then the modified hair layer (H2) will include a smaller region of hair, because the extended goatee includes less hair than the full beard.

Details of how the second neural network is trained to generate a modified hair layer (H2) are given below. However, in general, the second neural network is trained using training data comprising a plurality of images of heads of people with different cranial hairstyles and/or facial hairstyles. During the training process, the neural network learns to recognise features, and associations between features, that allow it to generate a modified hair layer (H2) based on the defined (e.g. desired) hairstyle and the subject's existing hair (i.e. defined by the hair layer). For example, the second neural network may be trained to generate a modified hair layer (H2) by predicting what the subject's existing hair would look like if it were shaved or trimmed into the defined hairstyle. The neural network model then generates a representation (e.g. pixels to added to the generated face layer) of new region of hair based on the defined hairstyle, which is referred to herein as the "modified hair layer" (H2).

At step 110, the method 100 comprises generating, using a processor, a modified image of the head of the subject by applying the modified hair layer (H2) to the generated face layer (F). Thus, the modified hair layer (H2) is combined with (e.g. by superimposition) the face layer (F) generated at step 104, to create an image of the subject with the existing region of hair having been replaced by a new hairstyle.

In some embodiments, the method 100 may further comprise providing the modified image for presentation to a user. For example, a processor performing the method 100 may generate (e.g. render) the modified image in a form which can be displayed on a display screen, such as the screen of a computing device, a smartphone, a tablet or desktop computer, an interactive/smart mirror, or the like. In this way, the user can see what they would look like with the modified hairstyle, and with the existing region of hair having been removed.

Figure 3:
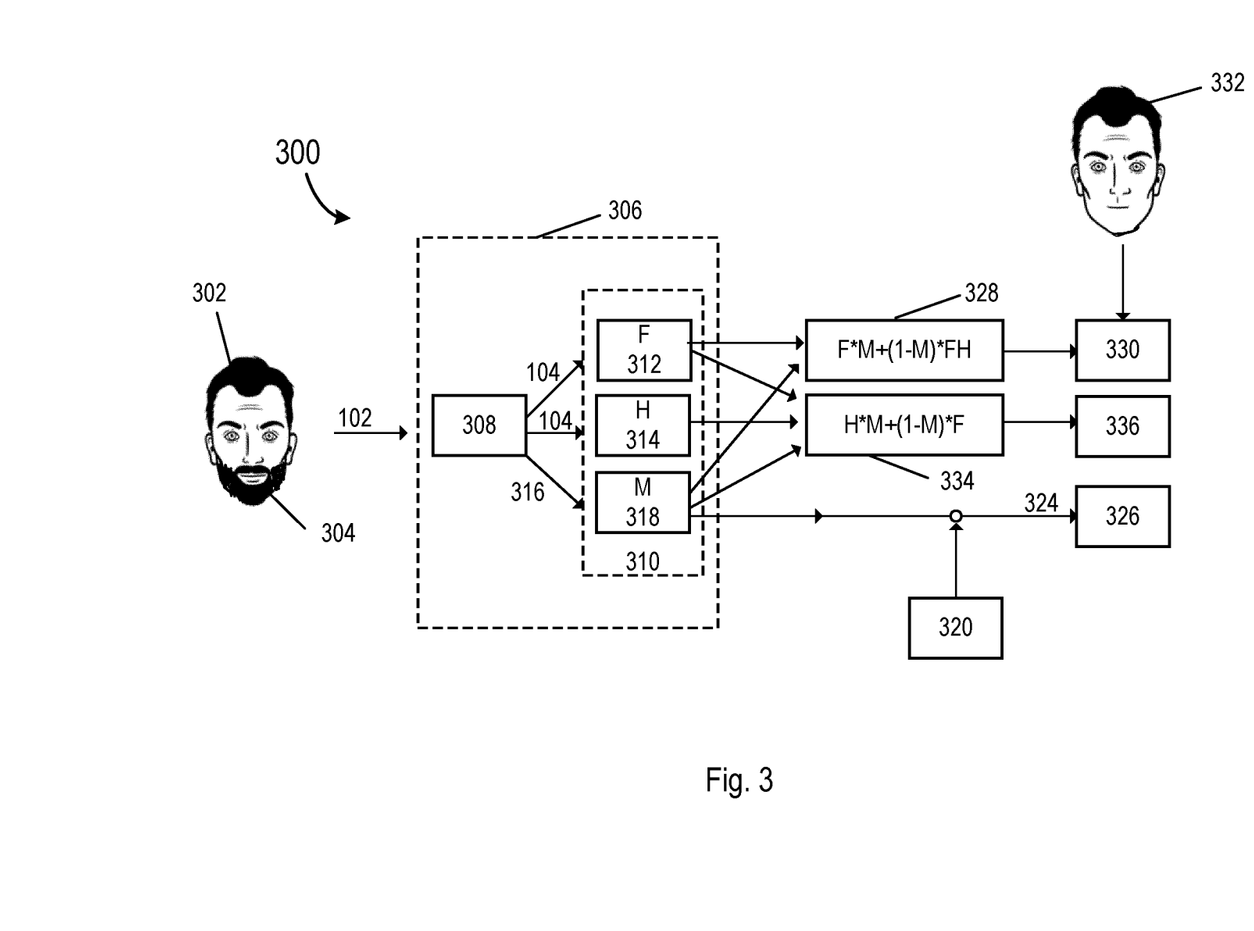
FIG. 3 is a flowchart of a further example of a method of modifying an appearance of hair in an image, according to various embodiments.

FIG. 3 is a flowchart of a further example of a method 300 of modifying an appearance of hair in an image. The method 300 includes some of the steps of the method 100 discussed above. An image 302 of a head of a subject having a region of hair 304 (e.g. a beard) is provided (step 102) as an input to a first trained neural network 306. In this example, the first neural network 306 comprises an encoder-decoder neural network model; however, in other examples, other types of neural network models may be used. The encoder-decoder neural network model in the example shown in FIG. 3 comprises an encoder network 308 and one or more decoder networks 310. The first neural network model 306 generates (step 104) as its outputs a face layer (F) 312 and a hair layer (H) 314.

In some embodiments, the method 100, 300 may further comprise, at step 316, generating, using the first trained neural network model 306 and based on the image 302 of the head, a hair mask (M) 318 defining the region of the image that contains hair. As discussed in greater detail below, the hair mask (M) 318 may be used by the second trained neural network to ensure that hair is not added (in the modified hair layer (M2)) where no hair was present in the original image 302. In this way, if a subject is generating a modified image during a shaving activity, for example, only those hairstyles that are achievable from the subject's existing hair will be generated.

In some embodiments, annotated images of heads of subjects having regions of hair may be available to the processor(s) performing the methods 100, 300. An annotated image 320 may, for example, comprise the image with an indication of the region of the image that contains hair. The indication may, in some embodiments, be made by a human operator who manually indicates (e.g. by marking an outline) the region of the image in which hair is present. In other embodiments, the indication may be made by a computer, which indicates on a pixel-by-pixel basis which regions of the image include hair. In some examples, a segmentation annotation may be generated, using a separate neural network trained to estimate the hairstyle annotation (i.e. estimate to the outline of the region of hair). Thus, according to some embodiments, the method 100, 300 may further comprise, at step 322, receiving, at a processor, an annotation 320 of the image of the head of the subject, the annotation comprising an indication of the region of the image 302 that contains hair. For example, the annotation 320 may be provided as an input to the first neural network 306, and the first neural network will attempt to generate a hair mask (M) 318 that matches, or closely resembles, the annotation. This may be done by comparing the annotation 320 with the hair mask 318 at each pixel point, and determining a degree of overlap. The neural network learns to maximise the overlapping portions. The annotation 320 may, in some embodiments, be used to calculate a degree of accuracy of the generate hair mask (M) 318 in the form of a segmentation loss or dice loss. Thus, the method 100, 300 may comprise, at step 322, calculating, using a processor, a degree of accuracy 324 of the generated hair mask (M) 318 with regard to the received annotation 320. The degree of accuracy may be referred to as a segmentation loss.

Block 328 of FIG. 3 represents how, according to some embodiments, a more accurate representation of the head of the subject with the region of hair having been removed may be generated. While the first trained neural network generates an estimation of what the subject's skin would look like if the region of hair were to be removed (i.e. the face layer (F)), the regions of the head outside the region of hair may include artefacts introduced by the processing performed by the network. Therefore, since a representation of those parts of the subject's head falling outside the region of hair can be obtained from the original image 302 provided to the first trained neural network model 306, block 328 shows how the original input image may be used for those parts of the image outside the region of hair. According to the expression F*M+(1−M)*FH in block 328, for any region of the head falling within the hair mask (M) 318, the generated face layer (F) is used in the estimated representation while, for any region of the head falling outside the hair mask (M) 318 the original image 302 is used in the estimated representation. Thus, the output of block 328 is a more accurate representation of the head subject having had the region of hair removed than the face layer (F) generated by the first neural network.

According to some embodiments, during training of the first neural network model, the quality of the generated face layer (F) assessed or evaluated. Thus, the method 100, 300 may, in some embodiments, comprise a step of evaluating, using a discriminative network, a quality of the generated face layer with regard to an image of a head of a subject with no visible hair in the region. In some embodiments, this may be done using a discriminative network that forms part of a generative adversarial network. A generative adversarial network (GAN) is a type of machine learning architecture in which to neural networks contest with each other. A generative network generates a candidate while a discriminative network evaluates the candidate. According to the present disclosure, the first neural network 306 may be considered to be the generative network as it generates a candidate face layer (F) to be evaluated by a discriminative network 330. The discriminative network 330 may be a neural network trained to discriminate between the generated face layer (F) and an image 332 of a face of a subject without the region of hair. If the discriminative network 330 is able to tell that the generated face layer (F) is a computer-generated image, rather than an actual image of a subject without the region of hair, then it may be determined that the quality of the generated face layer (F) is below a desired threshold (i.e. an intended confidence level is not reached), and the first neural network 306 (i.e. the generative network) may be required to generate a revised face layer (F) to be reassessed. If, however, the discriminative network 330 is unable to determine which of the generated face (F) and the image 332 is computer-generated, then it may be determined that the quality of the generated face layer (F) is above a desired threshold, such that the generated face layer F is accepted (i.e. an intended confidence level is reached). The metric by which the discriminative network 330 evaluates the quality of the generated face layer F may, in some embodiments, be referred to as a discriminator loss.

Block 334 of FIG. 3 represents how, according to some embodiments, the face layer (F) 312 and the hair layer (H) 314 may be combined in an attempt to obtain the original input image 302. Thus, according to the expression H*M+(1−M)*F in block 334, for any region of the head falling within the hair mask (M) 318, the generated hair layer (H) is applied while, for any region of the head falling outside the hair mask, the face layer (F) 312 is applied. During training of the first neural network model 306, the reconstruction of the original image, obtained by combining the hair layer (H) 314 and the face layer (F) 312, may be assessed or evaluated to establish the accuracy of the face layer and the hair layer generated by the first neural network 306. Thus, the method 100, 300 may, in some embodiments, comprise a step of evaluating, using a discriminative network, a quality of the generated face layer and beard layer. In some embodiments, this may be done using a discriminative network that forms part of a generative adversarial network. In this example, the first trained neural network 306 may be considered to be the generative network, as it generates the candidate face layer and hair layer, and the combination of these may be evaluated by a discriminative network 336. The discriminative network 306 may discriminate between the original input image 302 and the reconstruction of the image of the subject's head, formed using the expression of block 334. If the discriminative network 336 is able to determine that one of the images is not the original input image 302, then the first neural network 306 may be required to generate a revised face layer and hair layer. Otherwise, if the discriminative network 336 is unable to determine that one of the images is not the original input image 302, then the generated face layer and hair layer may be accepted. The metric by which the discriminative network 336 evaluates the quality of the hair layer and face layer may, in some embodiments, be referred to as a reconstruction loss.

Figure 4:
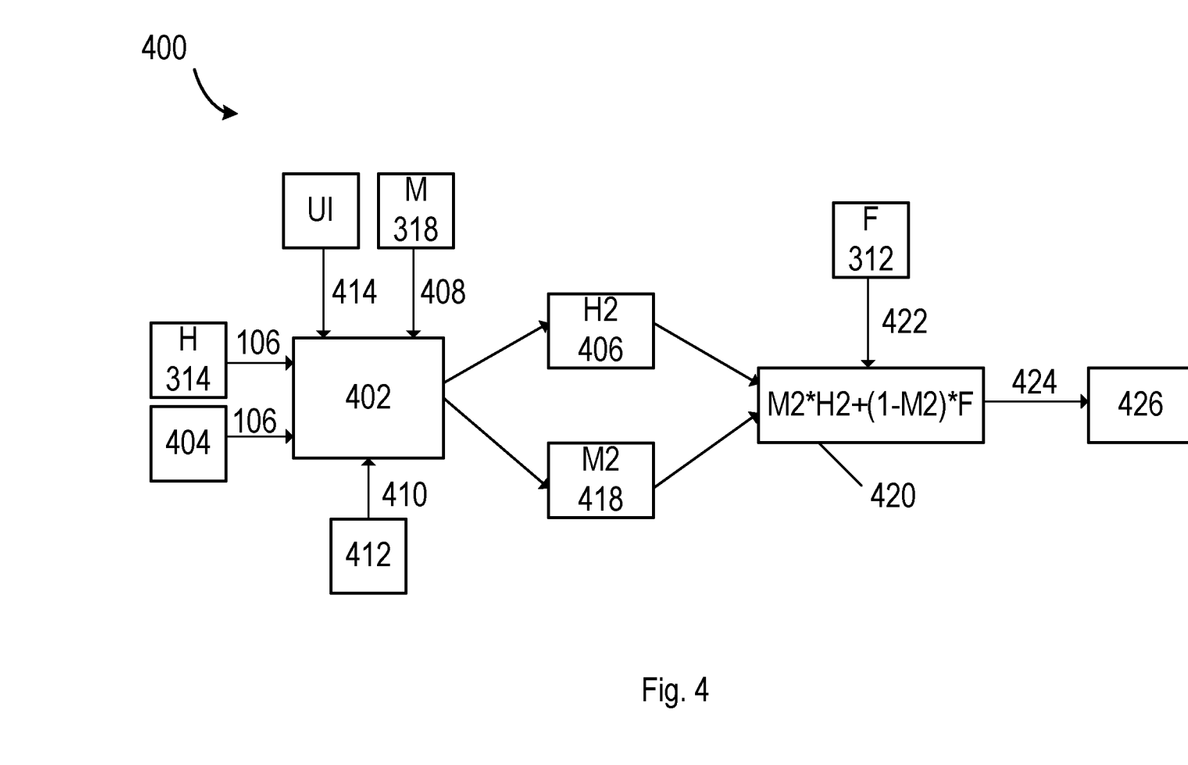
FIG. 4 is a flowchart of a further example of a method of modifying an appearance of hair in an image, according to various embodiments.

FIG. 4 is a flowchart of a further example of a method 400 of modifying an appearance of hair an image. The method 400 includes some of the steps of the method 100 discussed above. The hair layer (H) 314 generated by the first trained neural network model 306 is provided (step 106) as a first input to the second trained neural network models 402 in addition, a hairstyle indication 404 is provided (step 106) as a second input to the second trained neural network model 402. The hairstyle indication 404 comprises an indication of a defined hairstyle to be incorporated into the image. As discussed above, the defined hairstyle may, in some embodiments, comprise one of a plurality of standard hairstyles, such as the hairstyles 202 to 216 shown in FIG. 2. In other embodiments, the defined hairstyle may comprise a user-defined or user-selected hairstyle. In one example, the indication 404 may be provided in the form of an image of a hairstyle that the user would like to have incorporated into the image of their head. In other examples, a user may select a defined hairstyle from a list, and provide the indication 404 via a user interface.

Based on the inputs (i.e. the hair layer (H) 314 and the defined hairstyle indication 404), the second trained neural network 402 is configured to generate (step 108) a modified hair layer (H2) 406. The modified hair layer 406 comprises a representation of the region of hair 304 from the original image 302, which has been manipulated or adjusted to more closely match or resemble the defined hairstyle 404.

In some embodiments, the method 100, 300, 400 may further comprise a step of providing 408, as an input to the second trained neural network model 402, the generated hair mask (M) 318. In such embodiments, the step 108 of generating the modified hair layer may comprise generating a modified hair layer based on the generated hair mask (M) 318, such that the hair in the modified hair layer is generated only within regions defined by the generated hair mask. In this way, it is possible to restrict the functionality of the second trained neural network model to generate only those hairstyles that would "fit" within the region defined by the hair mask. That way, a user has the option to see only the hairstyles that could be achieved by cutting, shaving or trimming their hair; in other words, those hairstyles that are achievable with their current hair.

The method 100, 300, 400 may, in some embodiments, further comprise a step of providing 410, as an input to the second trained neural network model 402, a noise element 412. The noise element 412 may, for example, comprise random noise, and may be provided in the form of a vector. By including an element of noise 412 in the second neural network 402, variations of the defined hairstyle 404 may be incorporated into the modified hair layer 406. In this way, changes may be made to the defined hairstyle 404, ranging from very small changes to large changes, which introduce an element of variety into the modified hair layer generated by the second neural network 402.

In some embodiments, the method 100, 300, 400 may further comprise a step of receiving 414, via a user interface UI, a user input to modify a parameter of at least one of the generated hair layer (H) 314, the indication of the defined hairstyle 404 and the hair mask 318. The user input may, for example, be provided as a further input to the second trained neural network model 402. A user may, for example, modify an extent (e.g. boundary) of hair, a length of hair, a colour of hair and/or a coarseness of hair so that the hairstyle to be incorporated into the image is tailored in a way that suits the user. In other embodiments, other parameters may be modified. By modifying a parameter of the defined hairstyle 404, the user may tailor the appearance of the hairstyle to be incorporated onto the image of their head. By modifying the generated hair layer (H) 314, the user may manually adjust or correct the appearance of the hair layer as it has been generated by the first neural network model. By modifying the hair mask (M) 318, the user may enlarge or reduce the size of the region on their head within which hair may be modified.

According to some embodiments, the method 100, 300, 400 may comprise a step 416 of generating a modified hair mask (M2) 418. The modified hair mask 418 may define the new region of the subject's head within which hair is present, according to the modified hair layer 406. For example, if a subject's original facial hair defined a full beard, then the hair mask 318 would define the extent of the full beard. If the subject's modified hair layer 406, based on the defined hairstyle 404, was in the form of a goatee, then the modified hair mask 418 would be reduced to define the extent of the goatee, rather than the full beard.

Block 420 represents how, according to some embodiments, a modified image of the head of the subject may be generated using the outputs of the second trained neural network 402. The face layer (F) 312 is provided as an input at step 422 and, in block 420, the modified hair layer (H2) the modified hair mask (M2) and the face layer (F) may be combined to generate the modified image according to the expression M2*H2+(1−M2)*F in block 420, for any region of the head falling within the modified hair mask (M2) 418, the modified hair layer (H2) 406 is applied while, for any region of the head falling outside the modified hair mask, the face layer (F) 312 is applied. In this way, the modified hair layer is applied to the generated face layer, resulting in the modified image.

According to some embodiments, during training of the second neural network model 402, the quality of the generated modified image of the subject's head may be assessed or evaluated. Thus, the method 100, 200, 400 may, in some embodiments, comprise a step 424 of evaluating, using a discriminative network, a quality of the generated modified image of the head of the subject. As with embodiments discussed above, the discriminative network may form part of a generative adversarial network, in which the second neural network 402 may be considered to be the generative network which generates the modified image, to be evaluated by a discriminative network 426. The metric by which the discriminative network 426 evaluates the quality of the generated modified image of the subject's head may, in some embodiments, be referred to as an adversarial loss.

Figure 5:
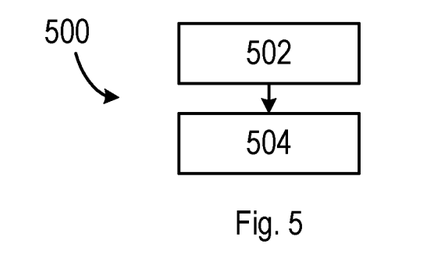
FIG. 5 is a flowchart of an example of a method of training a neural network to manipulate an appearance of hair in an image, according to various embodiments.

According to a second aspect, the present invention provides a method of training a neural network model to manipulate an appearance of hair in an image. FIG. 5 is a flowchart of an example of a method 500 of training a neural network model to manipulate an appearance of hair in an image of a head of a subject. The neural network model may, for example, comprise the first neural network model 306 discussed above. The method 500 comprises, at step 502, generating a training dataset comprising a plurality of images of heads of subjects, each having hair in a particular region, and a plurality of images of heads of subjects, each without hair in the particular region. In other words, multiple images of subjects are provided for training the neural network model, some of the subjects having a region of hair (e.g. a beard), and some of the subject's not having hair in that region (e.g. clean shaven). At step 504, the method 500 further comprises training the neural network model to generate, based on an input image of a head of a subject having hair in the particular region, an estimated representation of the head of the subject with the hair in the particular region having been removed. The training dataset allows the neural network model to recognise patterns and correlations between features in the images so that, given an image of a particular subject having hair in a particular region the trained model is able to estimate or predict what that subject would look like without hair in that particular region.

Figure 6:
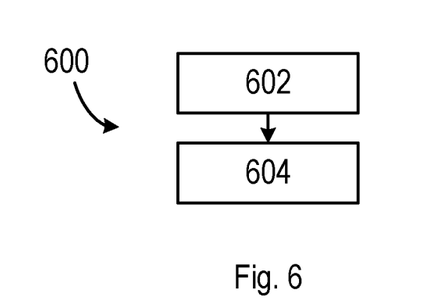
FIG. 6 is a flowchart of a further example of a method of training a neural network to manipulate an appearance of hair in an image, according to various embodiments.

According to a third aspect, the present invention provides a further method of training a neural network model to manipulate an appearance of hair in an image. FIG. 6 is a flowchart of a further example of a method 600 of training a neural network model to manipulate an appearance of hair in an image. The neural network model may, for example, comprise the second neural network model 402 discussed above. The method 600 comprises, at step 602, generating a training dataset comprising a plurality of hair layers, each hair layer comprising an estimated representation of portions of the image including hair, and a plurality of indicators of defined hairstyles to be incorporated into an image. In other words, a training dataset is created from multiple representations (e.g. images) of portions of an image containing hair, along with various hairstyles, such as those shown in FIG. 2. At step 604, the method 600 further comprises training the neural network model to generate, based on an input hair layer and a particular defined hairstyle, a modified hair layer. In other words, the training dataset allows the neural network model to modify or adjust an inputted hair layer more closely resemble a particular defined hairstyle.

The method 600 may, in some embodiments, further comprise providing to the neural network model during said training, a hair mask defining an extent of a hair-containing portion of the input hair layer and a noise element. The provision of a hair mask enables the neural network model to generate a modified hair layer that is compatible with (e.g. that fits within) the existing hair of the image. The provision of a noise element promotes variation within the modified hair layer generated by the neural network model.

The methods disclosed herein may be implemented in the form of a computer application. In some examples, the methods may be used as part of shaving simulation method, whereby a user is able to view one or more possible hairstyles on a representation of their face before commencing an act of shaving or trimming their hair.

Figure 7:
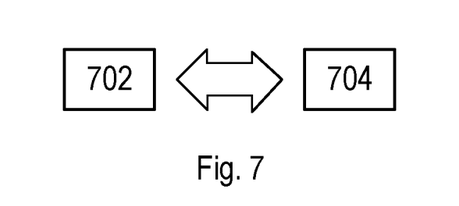
FIG. 7 is a schematic illustration of an example of a computer-readable medium in communication with a processor.

According to a fourth aspect, the present invention provides a computer program product. FIG. 7 is a schematic illustration of an example of a processor 702 in communication with a computer-readable medium 704. According to various embodiments, a computer program product comprises a computer readable medium 704, the computer-readable medium having computer-readable code embodied therein, the computer-readable code being configured such that, on execution by a suitable computer or processor 702, the computer or processor is caused to perform a method 100, 300, 400, 500, 600 as disclosed herein.

Figure 8:
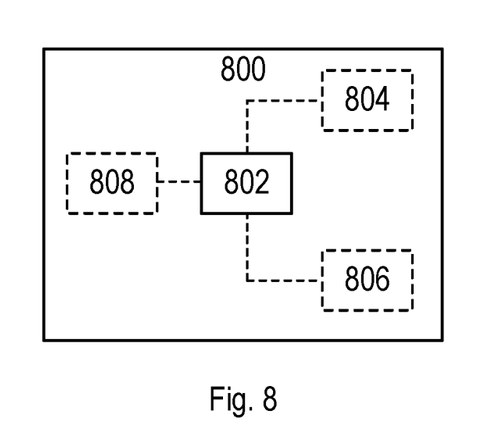
FIG. 8 is a schematic illustration of an apparatus for modifying an image of a head of a subject, according to various embodiments.

Any of the methods 100, 300, 400, 500, 600 discussed herein may be performed using a processor or multiple processing apparatus which may form part of one or more apparatuses. Thus, according to a fifth aspect, the present invention provides an apparatus for modifying an image of a head of a subject. FIG. 8 shows a block diagram of an apparatus 800 according to an embodiment that can be used for training a neural network model. With reference to FIG. 8, the apparatus 800 comprises a processor 802 that controls the operation of the apparatus 800 and that can implement the methods described herein. The apparatus 800 further comprises a memory 806 comprising instruction data representing a set of instructions. The memory 806 may be configured to store the instruction data in the form of program code that can be executed by the processor 802 to perform the methods described herein. In some implementations, the instruction data can comprise a plurality of software and/or hardware modules that are each configured to perform, or are for performing, individual or multiple steps of the method described herein. In some embodiments, the memory 806 may be part of a device that also comprises one or more other components of the apparatus 800 (for example, the processor 802 and/or one or more other components of the apparatus 800). In alternative embodiments, the memory 806 may be part of a separate device to the other components of the apparatus 800.

In some embodiments, the memory 806 may comprise a plurality of sub-memories, each sub-memory being capable of storing a piece of instruction data. In some embodiments where the memory 806 comprises a plurality of sub-memories, instruction data representing the set of instructions may be stored at a single sub-memory. In other embodiments where the memory 806 comprises a plurality of sub-memories, instruction data representing the set of instructions may be stored at multiple sub-memories. For example, at least one sub-memory may store instruction data representing at least one instruction of the set of instructions, while at least one other sub-memory may store instruction data representing at least one other instruction of the set of instructions. Thus, according to some embodiments, the instruction data representing different instructions may be stored at one or more different locations in the apparatus 800. In some embodiments, the memory 806 may be used to store information, data (e.g. images), signals and measurements acquired or made by the processor 802 of the apparatus 800 or from any other components of the apparatus 800.

The processor 802 of the apparatus 800 can be configured to communicate with the memory 806 to execute the set of instructions. The set of instructions, when executed by the processor 802 may cause the processor 802 to perform the method described herein. The processor 802 can comprise one or more processors, processing units, multi-core processors and/or modules that are configured or programmed to control the apparatus 800 in the manner described herein. In some implementations, for example, the processor 802 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

Returning again to FIG. 8, in some embodiments, the apparatus 800 may comprise at least one user interface 804. In some embodiments, the user interface 804 may be part of a device that also comprises one or more other components of the apparatus 800 (for example, the processor 802, the memory 806 and/or one or more other components of the apparatus 800). In alternative embodiments, the user interface 804 may be part of a separate device to the other components of the apparatus 800.

A user interface 804 may be for use in providing a user of the apparatus 800 with information resulting from the method according to embodiments herein. The set of instructions, when executed by the processor 802 may cause processor 802 to control one or more user interfaces 804 to provide information resulting from the method according to embodiments herein. Alternatively or in addition, a user interface 804 may be configured to receive a user input. In other words, a user interface 804 may allow a user of the apparatus 800 to manually enter instructions, data, or information. The set of instructions, when executed by the processor 802 may cause processor 802 to acquire the user input from one or more user interfaces 804.

A user interface 804 may be any user interface that enables rendering (or output or display) of information, data or signals to a user of the apparatus 800. For example, the user interface 804 may display a modified image of the subject. Alternatively or in addition, a user interface 804 may be any user interface that enables a user of the apparatus 800 to provide a user input, interact with and/or control the apparatus 800. For example, the user interface 804 may comprise one or more switches, one or more buttons, a keypad, a keyboard, a mouse, a mouse wheel, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, as illustrated in FIG. 8, the apparatus 800 may also comprise a communications interface (or circuitry) 808 for enabling the apparatus 800 to communicate with interfaces, memories and/or devices that are part of the apparatus 800. The communications interface 808 may communicate with any interfaces, memories and devices wirelessly or via a wired connection.

It will be appreciated that FIG. 8 only shows the components required to illustrate this aspect of the disclosure and, in a practical implementation, the apparatus 800 may comprise additional components to those shown. For example, the apparatus 800 may comprise a battery or other power supply for powering the apparatus 800 or means for connecting the apparatus 800 to a mains power supply.

According to some embodiments, the processor 802 may be configured to communicate with the memory 806 and to execute a set of instructions which, when executed by the processor, cause the processor to provide, as an input to a first trained neural network model, an image of a head of a subject having a region of hair; generate, using the first trained neural network model and based on the image of the head, a hair layer comprising an estimated representation of portions of the image including hair, and a face layer comprising a representation of the head of the subject with the region of hair having been removed; provide, as an input to a second trained neural network model, an indication of a defined hairstyle to be incorporated into the image, and the generated hair layer; generate, using the second trained neural network model and based on the indication of the defined hairstyle and the generated hair layer, a modified hair layer resembling the defined hairstyle; and generate a modified image of the head of the subject by applying the modified hair layer to the generated face layer.

In some embodiments, the apparatus 800 may further comprise a display (e.g. the user interface 804) to display the modified image of the head of the subject. The apparatus 800 may, in some embodiments, comprise, or form part of, a computing device, such as a smart phone, a tablet computer, a laptop computer or desktop computer, or an interactive mirror or smart mirror.

As noted above, the processor 702, 802 can comprise one or more processors, processing units, multi-core processors or modules that are configured or programmed to control the apparatus 800 in the manner described herein. In particular implementations, the processor 702, 802 can comprise a plurality of software and/or hardware modules that are each configured to perform, or are for performing, individual or multiple steps of the method described herein.

According to embodiments disclosed herein, trained neural network models are used to manipulate or modify an image of a subject who has a region of hair, such as facial hair or cranial hair. First, a trained neural network model modifies the image to "remove" the region of hair, by predicting what that region would look like if the hair were to be removed. Second, a trained neural network model generates a representation of an alternative region of hair to be added to the modified image. The resulting image is a realistic prediction of what the subject would look like with a modified hairstyle. Whereas, with existing techniques, it is difficult to generate a realistic modified image in situations where the subject has existing hair, using the techniques disclosed herein, a modified hairstyle may be applied to an image of the subject whether or not the subject has existing hair.

The methods and apparatus disclosed herein may be implemented and used in numerous different ways. In one example, the invention may be used to simulate different hairstyles (e.g. facial hair styles) using existing defined hairstyles, such as those shown in FIG. 2. In another example, the invention may be used to create new hairstyles, or variations of existing hairstyles, for example by combining existing hairstyles or by modifying existing hairstyles. The new hairstyles may then be displayed on an image of the user. In another example, the invention may be used to generate a simulation of a hairstyle from a picture (i.e. a source image) of a different person. With this example, the hairstyle may not resemble one of the existing defined hairstyles. Therefore, the method may involve segmenting the source image to extract the shape of the region of hair (e.g. the beard) from the source image so that it can be positioned on the target image (e.g. the image of the subject) and modified to fit the head of the subject. In another example, as discussed above, a constraint may be implemented to ensure that hairstyles are only available to be added to the image of the subject if they can be achieved using the subject's existing hair. This may be achieved by using the hair mask to see which defined hairstyles are available for use. In another example, hairstyles may be modifiable or manipulatable via a user input. A user may, for example, modify the length of hair in a particular hairstyle, or the shape of a boundary of the hairstyle with the skin of the subject. This provides a user with an opportunity to design a unique hairstyle. In another example, a recommendation may be provided to a subject based on other subjects. For example, the method may involve querying a database of other subjects having a plurality of hairstyles. The method may find a subject who has similar characteristics (e.g. face shape, chin shape or beard or hairstyle) to the subject and recommend a hairstyle to the subject based on those characteristics. Another example, modified images of subjects may be shared (e.g. via social media) with other users. In another example, the modified image of the subject may be used as a guide for trimming or shaving their face or head. Based on the chosen hairstyle, a recommendation of a personal care device to be used may be provided to the subject.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of modifying an appearance of hair in an image of a head of a subject, the method comprising:
providing, as an input to a first trained neural network model, the image of the head of the subject having a region of hair;
generating, using the first trained neural network model and based on the image, a hair layer comprising an estimated representation of portions of the image including hair, and a face layer comprising an estimated representation of the head of the subject with the region of hair having been removed and an estimation of skin of the subject in the removed region of hair;
providing, as an input to a second trained neural network model, an indication of a defined hairstyle to be incorporated into the image, and the generated hair layer;
generating, using the second trained neural network model, a modified hair layer based on the indication of the defined hairstyle and the generated hair layer; and
generating, using a processor, a modified image of the head of the subject by applying the modified hair layer to the generated face layer.

2. The method according to claim 1, further comprising:
generating, using the first trained neural network model and based on the image, a hair mask defining a region of the image that contains hair.

3. The method according to claim 2, further comprising:
receiving, at a processor, an annotation of the image of the head of the subject, the annotation comprising an indication of the region of the image that contains hair; and
calculating, using a processor, a degree of accuracy of the generated hair mask with regard to the received annotation.

4. The method according to claim 2, further comprising:
providing, as an input to the second trained neural network model, the generated hair mask,
wherein the modified hair layer is generated based on the generated hair mask, such that hair in the modified hair layer is generated only within regions defined by the generated hair mask.

5. The method according to claim 2, further comprising:
receiving, via a user interface, a user input to modify a parameter of at least one of the generated hair layer, the indication of the defined hairstyle and the hair mask.

6. The method according to claim 1, wherein at least one of the first and second trained neural network models comprises or forms part of a generative adversarial network.

7. The method according to claim 1, further comprising:
providing the modified image for presentation to a user.

8. The method according to claim 1, further comprising:
evaluating, using a discriminative network, a quality of the generated face layer with regard to an image of the head of the subject with no visible hair in the region of hair.

9. The method according to claim 1, further comprising:
evaluating, using a discriminative network, a quality of the generated modified image of the head of the subject.

10. A non-transitory computer-readable medium storing computer-readable code, that, on execution by a computer or processor, causes the computer or processor to perform the method as claimed in claim 1.

11. A method of training a neural network model to manipulate an appearance of hair in an image, the method comprising:
generating a training dataset comprising a plurality of images of heads of subjects, each having hair in a particular region, and a plurality of images of heads of subjects, each showing the particular region without hair in the particular region; and
training the neural network model to generate, based on an input image of a head of a subject having hair in the particular region, an estimated representation of the head of the subject with the hair in the particular region having been removed using the training dataset.

12. A method of training a neural network model to manipulate an appearance of hair in an image, the method comprising:
generating a training dataset comprising a plurality of hair layers respectively comprising estimated representations of portions of images containing hair, and a plurality of defined hairstyles; and
training the neural network model to generate, based on an input hair layer and a particular defined hairstyle of the plurality of defined hairstyles, a modified hair layer comprising the input hair layer modified to more closely resemble the particular defined hair style.

13. The method according to claim 12, further comprising:
providing to the neural network model during said training, a hair mask defining an extent of a hair-containing portion of the input hair layer and a noise element.

14. An apparatus for modifying an image of a head of a subject, the apparatus comprising:
a memory comprising instruction data representing a set of instructions, and
a processor configured to communicate with the memory and to execute the set of instructions, wherein the set of instructions, when executed by the processor, cause the processor to:
provide, as an input to a first trained neural network model, the image of the head of the subject having a region of hair;
generate, using the first trained neural network model and based on the image, a hair layer comprising estimated representation of portions of the image containing hair, and a face layer comprising a representation of the head of the subject with the region of hair having been removed and an estimation of skin of the subject in the removed region of hair;
provide, as an input to a second trained neural network model, an indication of a defined hairstyle to be incorporated into the image, and the generated hair layer;
generate, using the second trained neural network model and based on the indication of the defined hairstyle and the generated hair layer, a modified hair layer resembling the defined hairstyle; and
generate a modified image of the head of the subject by applying the modified hair layer to the generated face layer.

15. The apparatus according to claim 14, further comprising:
a display to display the modified image of the head of the subject.

16. The apparatus according to claim 14, wherein the set of instructions further cause the processor to:
generate, using the first trained neural network model and based on the image, a hair mask defining a region of the image that contains hair.

17. The apparatus according to claim 16, wherein the set of instructions further cause the processor to:
receive an annotation of the image of the head of the subject, the annotation comprising an indication of the region of the image that contains hair; and
calculate a degree of accuracy of the generated hair mask with regard to the received annotation.

18. The apparatus according to claim 16, wherein the set of instructions further cause the processor to:
provide, as an input to the second trained neural network model, the generated hair mask, wherein the modified hair layer is generated based on the generated hair mask, such that hair in the modified hair layer is generated only within regions defined by the generated hair mask.

19. The apparatus according to claim 16, wherein the set of instructions further cause the processor to:
 receive, via a user interface, a user input to modify a parameter of at least one of the generated hair layer, the indication of the defined hairstyle, and the hair mask; and
 modify the at least one of the generated hair layer, the indication of the defined hairstyle, and the hair mask according to the parameter.

20. The apparatus according to claim 14, wherein the set of instructions further cause the processor to:
 evaluate a quality of the generated face layer with regard to another image of the head of the subject with no visible hair in the region of hair; and
 evaluate a quality of the generated modified image of the head of the subject.

\* \* \* \* \*